W. A. DALTON.
FERTILIZER DISTRIBUTING ATTACHMENT.
APPLICATION FILED MAY 11, 1912.
1,040,642.
Patented Oct. 8, 1912.
2 SHEETS—SHEET 2.
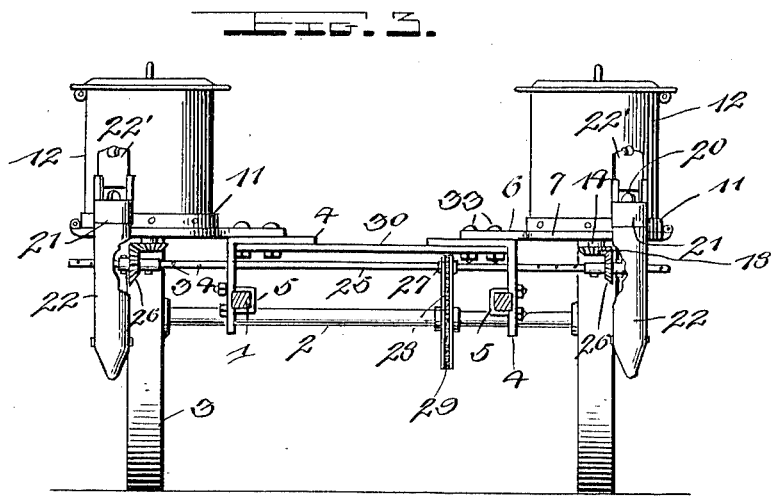
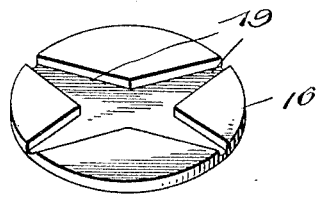
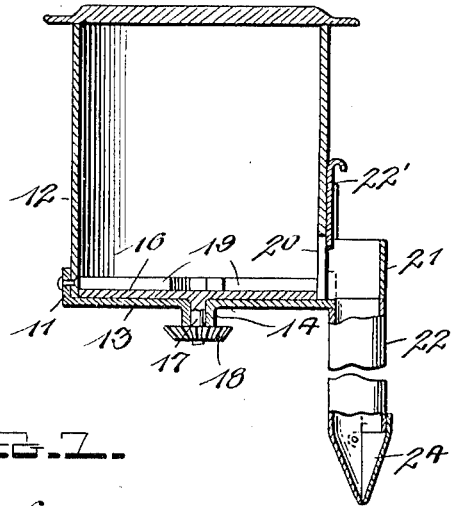
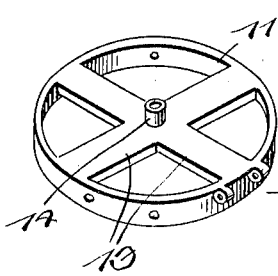
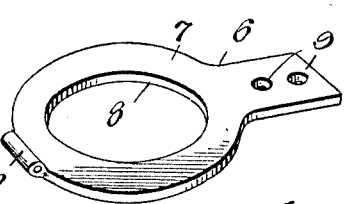
Witnesses
Chas. L. Griesbauer.
A. B. Norton.
Inventor
W. A. Dalton,
By Watson E. Coleman,
Attorney

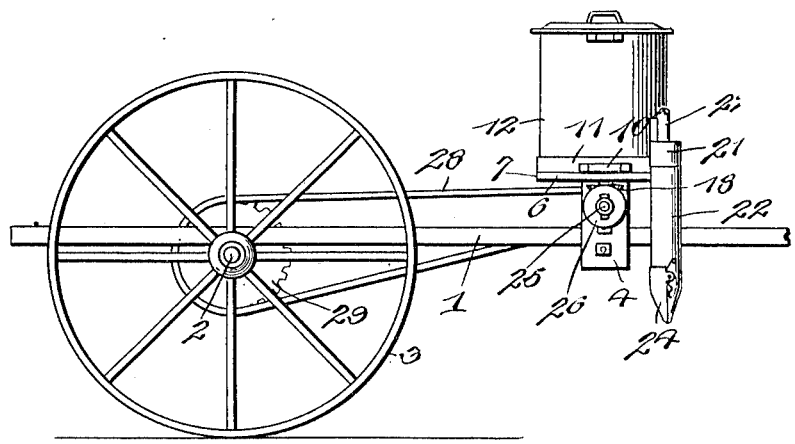

UNITED STATES PATENT OFFICE.

WILLIAM A. DALTON, OF PATTON, MISSOURI.

FERTILIZER-DISTRIBUTING ATTACHMENT.

1,040,642. Specification of Letters Patent. Patented Oct. 8, 1912.

Application filed May 11, 1912. Serial No. 696,706.

*To all whom it may concern:*

Be it known that I, WILLIAM A. DALTON, a citizen of the United States, residing at Patton, in the county of Bollinger and State of Missouri, have invented certain new and useful Improvements in Fertilizer-Distributing Attachments, of which the following is a specification, reference being had to the accompanying drawings.

This invention relates to new and useful improvements in fertilizer distributing attachments for corn planters, the object of the invention being to improve the construction of attachments of this character so that in planting corn, cotton and various other seeds, and when planting corn in hills the fertilizer will be deposited upon each hill, and when drilling corn with corn drills, the fertilizer will be deposited in the row with the corn.

Another object of the invention is to provide an attachment of this character which will possess advantages in points of efficiency and durability, is inexpensive to manufacture and at the same time is simple in construction and operation.

With the above and other objects in view the invention consists in the novel features of construction and the combination and arrangement of parts hereinafter more fully described, pointed out in the claims, and shown in the accompanying drawings in which, Figure 1 is a side elevation of a corn planter showing my improved fertilizer attachment applied thereto. Fig. 2 is a top plan view showing one of the hoppers in section. Fig. 3 is a rear elevation. Fig. 4 is a vertical sectional view taken through one of the hoppers. Fig. 5 is a detail perspective view of one of the distributing disks. Fig. 6 is a bottom perspective view of one of the rings which is secured to the hopper. Fig. 7 is a perspective view of one of the adjusting plates.

Referring more particularly to the drawings, 1 indicates the frame of a corn planter of any well known construction which is suitably supported upon the axle 2, upon the ends of which are mounted the wheels 3. Angular supporting brackets 4 are provided and are secured to the frame 1 by means of the U shaped bolts 5. Securely bolted to the horizontal portions of the brackets are the plates 6, which are substantially circular in form at one end as shown at 7 and provided with the opening 8, the other ends of said plates being of elongated shape and provided with a plurality of openings 9 whereby the same may be securely bolted to the horizontal portions of the brackets 4, the knuckles 10 are formed on one side of the circular ends 7 and are hingedly connected to one side of the rings 11, so that the hoppers 12 can be swung out whereby the fertilizer contained therein can be easily removed. The rings 11 are riveted to the lower ends of the hoppers 12 and provided with the cross strips 13 arranged at right angles to each other, on the intermediate portions of which is formed the downwardly extending sleeves 14.

Rotatably mounted within the hoppers are the fertilizer disks 16, having a pin 17 formed on the lower side thereof and adapted to be disposed through the sleeves 14 and having the gears 18 mounted upon the lower ends thereof. The disks 16 are provided with the radially projecting grooves 19 adapted to receive the fertilizer and discharge it through the openings 20 formed in one side of the hoppers 12. Secured to the sides of the hoppers and arranged so as to partially house the openings 20 are the circular housings 21 which are adapted to guide the fertilizer into the upper end of the spouts 22 which are secured to the rings 11. Slides 22' are mounted upon the hoppers and adapted to close the openings 20 to regulate the flow of the fertilizer into the spouts 22. When the attachment is used upon a check-row planter, the spouts 22 are provided with the spring leaf valves 24.

Rotatably mounted in the vertical portions of the plates 4 is a shaft 25 upon which are mounted the gears 26 adapted to mesh with the gears 18 upon the lower ends of the pins 17 to rotate the disks 16. Mounted upon the shaft 25 is the sprocket 27 adapted to be connected to the chain 28 through the sprocket 29 which is mounted on the main axle 2.

It will be readily understood that the hoppers are adapted for relative lateral adjustment according to the widths of the rows in which the grain is planted. In adjusting the hoppers the elongated plate 30 is provided with a plurality of openings 31 adapted to register with the openings 32 formed in the longitudinal portions of the brackets 4, and having the openings 9 in the plate 6 register with the openings 31 and 32 so that the bolts 33 may be placed therein, thus it will be seen that the hoppers 12 may be adjusted to the various widths of rows and held in an adjusted position by means of the bolts 33. The shaft 25 is also provided with a plurality of openings 34 so that the gears 26 can be easily adjusted thereon.

From the above description taken in connection with the drawings it will be readily apparent that I have provided a simple and inexpensive attachment for planters whereby fertilizer may be readily deposited with the corn, cotton and various other seeds at the time of planting.

While I have shown and described the preferred form of my invention it will be obvious that various changes in the details of construction and in the proportions may be resorted to for successfully carrying my invention into practice without sacrificing any of the novel features or departing from the scope thereof.

What I claim is:—

1. In a device of the character described, the combination of a frame, angular plates secured to said frame, hoppers mounted upon said plates and adapted for lateral adjustment, rotary disks mounted within said hoppers, said disk being provided with a plurality of radially projecting grooves, said hoppers each having an opening formed on one side thereof, discharged spouts communicating with said openings, a shaft mounted in the vertical portions of said plates, and means mounted upon said shaft adapted to communicate motion to the disks to discharge fertilizer through the openings in the side of the hoppers into the discharge spout.

2. In a device of the character described, the combination of a frame, angular plates mounted upon the frame having a plurality of openings formed in their horizontal portions, an elongated connecting plate having a plurality of openings formed therein and adapted to connect the ends of the horizontal portions of the first plates, hoppers mounted upon said plates, rotary fertilizer disks mounted in said hoppers having a plurality of radially disposed grooves therein, pins formed upon the lower side of said disks and adapted to project through the bottom of the hoppers, gears mounted upon the lower ends of said pins, said hoppers each having an opening in one side thereof, discharge spouts communicating with said openings, a shaft mounted in the vertical portions of the angular plates, gears mounted upon said shaft and adapted to mesh with the gears on the lower ends of said pins, and means for rotating said shaft to revolve the fertilizer disks and distribute the fertilizer through the openings in the sides of the hoppers into the discharge spouts.

3. In a device of the character described, the combination of a frame, angular plates mounted upon the frame, securing plates mounted upon said angular plates and adjustably secured thereto, said securing plates having their outer ends provided with a circular enlargement, having a similar shaped opening formed therein, rings hingedly secured to the outer ends of said securing plates, cross strips arranged in said rings at right angles to each other, hoppers having their lower ends disposed within said rings and rigidly secured thereto, downwardly extending sleeves formed on the lower side of the cross strips, rotary distributing disks mounted in said hoppers, having a plurality of radially disposed grooves formed therein, centrally arranged pins formed on the lower side of said disks and disposed within said sleeves, gears mounted upon the lower ends of said pins, said hoppers each having an opening in one side thereof, discharge spouts communicating with said openings, a shaft mounted in the vertical portions of the angular plates, gears mounted upon said shaft and adapted to mesh with the gears on the lower ends of the pins, and means for rotating said shaft to revolve the distributing disks and distribute the fertilizer through the openings in the sides of the hopper into the discharge spouts.

4. In a device of the character described, the combination of a frame, angular plates secured to said frame, hoppers mounted upon the plates and adapted for lateral adjustment, said hoppers each having an opening formed in one side thereof, discharge spouts communication with said openings and means for discharging fertilizer through the openings in the side of the hopper into the discharge spouts.

5. In a device of the character described, the combination of a frame, angular plates mounted upon the frame having a plurality of openings formed in their horizontal portion, an elongated connecting plate having a plurality of openings formed therein and adapted to connect the ends of the horizontal portions of the angular plates, hoppers mounted upon said plates and adapted for lateral adjustment, said hoppers each having an opening formed in one side thereof, discharge spouts communicating with said openings, and means for discharging fertilizer through the openings in the side of the hoppers into the discharge spouts.

6. In a device of the character described, the combination of a frame, angular plates secured to said frame, hoppers mounted upon said plates and adapted for lateral adjustment, said hoppers each having an opening in one side thereof, rotary disks mounted in said hoppers having a plurality of radially disposed grooves therein, pins formed upon the lower side of said disks and adapted to project through the bottom of the hoppers, gears mounted upon the lower ends of said pins, discharge spouts communicating with the openings in the hoppers, a shaft mounted in the vertical portions of the angular plates, gears mounted upon said shaft and adapted to mesh with the gears on the lower ends of said pins, and means for rotating said shaft to revolve the fertilizer disks and distribute the fertilizer through the openings in the hoppers into the discharge spouts.

7. In a device of the character described, the combination of a frame, angular plates mounted upon the frame, securing plates mounted upon said angular plates and adjustably secured thereto, said securing plates having their outer ends provided with a circular enlargement, having a similar shaped opening formed therein, rings hingedly secured to the outer ends of said securing plates, cross strips arranged in said rings at right angles to each other, hoppers having their lower ends disposed within said rings and rigidly secured thereto, said hoppers each having an opening formed in one side thereof, discharge spouts communicating with said openings, and means for discharging fertilizer through the openings in the sides of the hoppers into the discharge spouts.

In testimony whereof I hereunto affix my signature in the presence of two witnesses.

WILLIAM A. DALTON.

Witnesses:
HENRY M. KNOWLES,
WM. F. WELLS.

---

Copies of this patent may be obtained for five cents each, by addressing the "Commissioner of Patents, Washington, D. C."